US009284073B2

(12) United States Patent
Bigelow

(10) Patent No.: US 9,284,073 B2
(45) Date of Patent: *Mar. 15, 2016

(54) STANDARD TRANSIT TUG

(71) Applicant: Bigelow Aerospace LLC, Las Vegas, NV (US)

(72) Inventor: Robert T. Bigelow, Las Vegas, NV (US)

(73) Assignee: Bigelow Aerospace, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/120,842

(22) Filed: Jul. 2, 2014

(65) Prior Publication Data

US 2015/0008288 A1 Jan. 8, 2015

Related U.S. Application Data

(60) Provisional application No. 61/957,658, filed on Jul. 8, 2013.

(51) Int. Cl.
*B64G 1/64* (2006.01)
*B64G 1/10* (2006.01)

(52) U.S. Cl.
CPC .............. *B64G 1/646* (2013.01); *B64G 1/1078* (2013.01)

(58) Field of Classification Search
CPC .............. B64G 1/64; B64G 1/22; B64G 1/40; B64G 1/00; B64G 1/646; B64G 1/402; B64G 1/443; B64G 1/401
USPC .......... 244/171.1, 172.6, 172.4, 158.2, 158.1, 244/172.3, 172.5
See application file for complete search history.

(56) References Cited

U.S. PATENT DOCUMENTS

| 3,891,160 | A | * | 6/1975 | Minovitch | 244/171.1 |
|---|---|---|---|---|---|
| 4,664,343 | A | * | 5/1987 | Lofts et al. | 244/171.1 |
| 4,834,325 | A | * | 5/1989 | Faget et al. | 244/159.4 |
| 4,964,596 | A | * | 10/1990 | Ganssle et al. | 244/172.5 |
| 5,372,340 | A | * | 12/1994 | Ihara et al. | 244/172.5 |
| 5,429,328 | A | * | 7/1995 | Dobbs et al. | 244/172.5 |
| 5,511,748 | A | * | 4/1996 | Scott | 244/172.5 |
| 5,779,195 | A | * | 7/1998 | Basuthakur et al. | 244/173.1 |
| 6,017,000 | A | * | 1/2000 | Scott | 244/158.6 |
| 6,177,629 | B1 | * | 1/2001 | Katz | 136/244 |
| 6,523,784 | B2 | * | 2/2003 | Steinsiek et al. | 244/172.4 |
| 7,207,525 | B2 | * | 4/2007 | Bischof et al. | 244/172.6 |
| 7,575,200 | B2 | * | 8/2009 | Behrens et al. | 244/172.3 |
| 7,861,975 | B2 | * | 1/2011 | Behrens et al. | 244/172.5 |
| 2003/0164428 | A1 | * | 9/2003 | Anderman et al. | 244/161 |
| 2004/0026571 | A1 | * | 2/2004 | Scott | 244/158 R |
| 2004/0031885 | A1 | * | 2/2004 | D'Ausilio et al. | 244/172 |
| 2004/0245407 | A1 | * | 12/2004 | D'Ausilio et al. | 244/172 |
| 2005/0151022 | A1 | * | 7/2005 | D'Ausilio et al. | 244/172 |
| 2006/0278765 | A1 | * | 12/2006 | Strack et al. | 244/172.4 |
| 2007/0040067 | A1 | * | 2/2007 | D'Ausilio et al. | 244/172.5 |
| 2007/0228220 | A1 | * | 10/2007 | Behrens et al. | 244/172.5 |
| 2008/0121759 | A1 | * | 5/2008 | Behrens et al. | 244/172.3 |

* cited by examiner

*Primary Examiner* — Tien Dinh
*Assistant Examiner* — Assres H Woldemaryam
(74) *Attorney, Agent, or Firm* — Franklin E. Gibbs

(57) ABSTRACT

A standard transit tug is disclosed. The tug can dock with spacecraft to provide propulsion for the spacecraft. Further, the tug may dock with other specialty tugs to form a custom transport system.

2 Claims, 2 Drawing Sheets

STANDARD TRANSIT TUG

RELATED APPLICATIONS

This application claims priority under 35 U.S.C. §119 to U.S. Provisional Application No. 61/957658 filed on Jul. 8, 2013, the contents of which are incorporated herein by reference in its entirety.

FIELD OF THE INVENTION

This invention generally relates to space vehicles that can operate as space tugs for other spacecraft.

BACKGROUND OF THE INVENTION

Space exploration is a rapidly developing field. The types of spacecraft cover a vast range including manned hard shelled space stations, space shuttles, and satellites—to name a few. These crafts usually provide invaluable information and services. However, the fact that these devices are operating in the generally inhospitable environment of space incorporates a unique set of issues. One such issue is a lack of the ability to move or transport vessels in space.

Many spacecraft are deployed to an orbital trajectory or a geostationary orbit. Satellites are an example of such crafts in space. While satellites can have propulsion systems that allow for some orbital correction, there is generally not a robust propulsion system on the craft that would allow for significant changes to the orbit. Nor is there any propulsion systems currently deployed on satellites that would accommodate transporting the craft to a repair facility in space. One reason for the lack of such propulsion systems on many spacecraft is the cost for deploying the extra weight into space.

What is needed is a standard transit tug to assist in moving and transporting space craft. The standard transit tug could also be adaptable to work with other specialty tugs in space.

SUMMARY OF THE INVENTION

A standard transit tug is disclosed and includes a frame having a first and second ends, an outer periphery, and a substantially hollow interior. There is also a docking adapter disposed on the first and second ends of the frame.

A plurality of chemical tanks are disposed within the frame with at least one tank comprised of an oxidizer and one tank comprised of a propellant. Each tank has an access valve for refueling in space and each tank can be removed from the frame such that a tank can be replaced in space.

A plurality of nozzles is disposed on the outer periphery of the frame and each nozzle has a valve for regulating the flow of the oxidizer and fuel from the tanks. The number and disposition of the nozzles can be chosen for a desired execution of orienting and propelling the tug in space.

There is a plurality of solar cell arrays disposed on the outer periphery of the frame and each solar cell array independently pivotal in relation to the frame. Also present is at lease on battery and a wireless communications system connected to the batteries.

A computer is connected to the batteries, the nozzle valves, the positioning system of the solar cell arrays, the solar cell arrays, the communications system, and the computer controls charging of the at least one battery by the solar cell arrays, directs the flow of the oxidizer and fuel to each nozzle, controls ignition of the oxidizer and fuel combination, controls the positioning of the solar cell arrays, operates the communications system, executes avionics software, provides a status of the tug including the level of oxidizer and fuel in the tanks, operates the docking adapters, and implements a three axis attitude control.

In operation, power is provided to the space tug by the solar cell arrays and the computer can be accessed through a wireless communications so that the tug can be moved to a desired location in space and attached by way of a docking adapter to another craft and provide propulsion to the craft.

BRIEF DESCRIPTION OF THE DRAWINGS

The invention is generally shown by way of reference to the accompanying drawings in which.

DETAILED DESCRIPTION OF THE INVENTION

Figure 1:
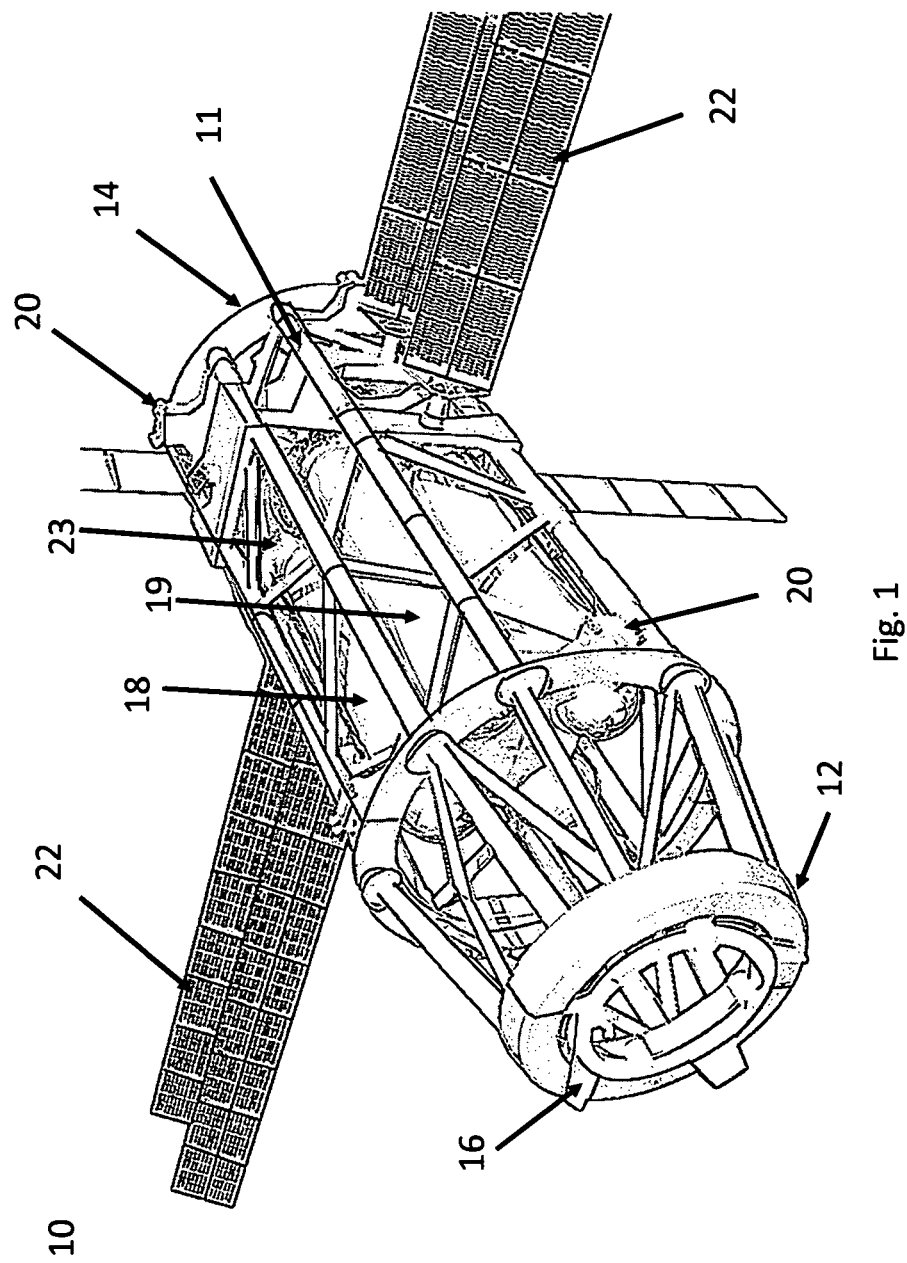
FIG. 1 is a perspective side view of the standard space tug showing the front end of the tug.
Figure 2:
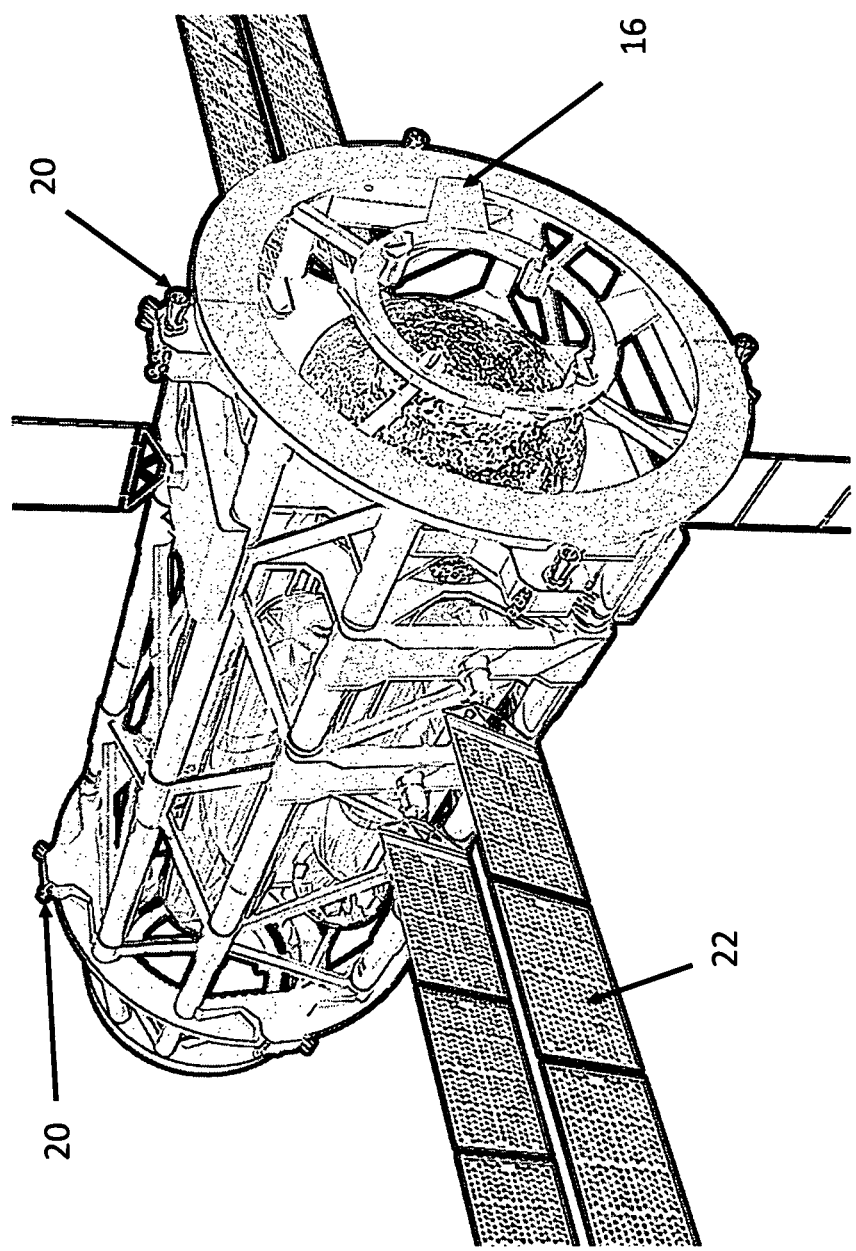
FIG. 2 is a perspective side view of the standard space tug showing the back end of the tug.

FIG. 1 perspective side view of one embodiment of a standard transfer tug 10. There is a frame 11 having a first 12 end and a second 14 end, an outer periphery, and a substantially hollow interior. A docking adapter is disposed on the first and second ends of the frame. The docking adapter 16 can be generic type of adapter for use with adapters on manned spacecraft. The adapters are also used to connect two tugs together. In this fashion various types of tugs can be connected in series. For example, there could be two standard transfer tugs connected to a tug that provides electrical power through large solar panels to form a series of three tugs. This series could then be docked to a manned spacecraft. The series could provide propulsion and power to the manned spacecraft. However, the invention is not limited to combining only three tugs and can be expanded from a single tug to two tugs to other combinations.

A plurality of chemical tanks are disposed within the frame, at least one tank comprised of an oxidizer 18 and one tank comprised of a propellant 19, each tank having an access valve for refueling in space. In one embodiment, each tank can be removed and replaced in space. However, the invention is not limited to refueling or replacing tanks. In one embodiment, the standard transit tug may be discarded after use. In another embodiment, the tanks may have a measure of protection afforded by meteor shielding disposed over the surface of the tug.

There are a number of nozzles disposed on the outer periphery of the frame. Each nozzle has a valve for regulating the flow of the oxidizer and fuel from the tanks 20. Depending upon the application, the number and disposition of the nozzles can be chosen for a desired execution of orienting and propelling the tug in space. Some nozzles may be chosen for positioning of the tug while others may be robust enough for providing a large amount of thrust for extended periods.

A plurality of solar cell arrays 22 are disposed on the outer periphery of the frame and each solar cell array is independently pivotal in relation to the frame. The solar cells would provide power to the tug. The pivoting feature allows the arrays to be directed toward the Sun for optimum production of electricity. The movement of the arrays in relation to the frame is directed by a positioning system. The power from the panels can be used to charge a number of batteries. Also present is a wireless communications system connected to the batteries and a computer. The computer is connected to the batteries, the nozzle valves, the positioning system of the solar cell arrays, the solar cell arrays, the communications system, and the computer controls charging of the batteries by the solar cell arrays, directs the flow of the oxidizer and fuel to each nozzle, controls ignition of the oxidizer and fuel combination, controls the positioning of the solar cell arrays, operates the communications system, executes avionics software, provides a status of the tug including the level of oxidizer and fuel in the tanks, operates the docking adapters, and implements a three axis attitude control.

In another embodiment, the tug may include sensing elements to detect the position of a spacecraft and transmitting that information to the operator. The tug could then provide data important to docking with a spacecraft.

The power is provided to the space tug by the solar cell arrays and the computer can be accessed through a wireless communications so that the tug can be moved to a desired location in space and attached by way of a docking adapter to another craft and provide propulsion to the craft.

In one embodiment, the tug may contain a cable running substantially the length of the tug that could be attached at one end to a manned spacecraft and at the other to another tug that would have large solar panels to provide power to the spacecraft. The tug with the large panels would operate as a solar generator tug. Thus, the power from the solar generator tug could be directed through the cable and to the spacecraft. This flexibility allows the standard transfer tug to operate as a building block for use with other specialty tugs to fashion a custom transport vehicle system. The cable could be constructed such that it would be automatically connected and disconnected to other tugs or spacecraft.

In another embodiment, there is a communications and data cable running substantially the length of the tug that could be attached at one end to a manned spacecraft and at the other to another tug such as a solar generator tug to allow transmission of data to the spacecraft. The cable could be constructed such that it would be automatically connected and disconnected to other tugs or spacecraft. In another embodiment, there is a data cable with one end attached to the standard transit tug computer and the other end capable of attaching to a spacecraft so that control of the standard transit tug can be controlled from the attached spacecraft.

The tug may be constructed to a variety of scales. For example, in one embodiment a tug may be designed to provide enough thrust to reorient a satellite in low Earth orbit. In another embodiment, the tug may provide enough propulsion to propel a manned spacecraft to a geosynchronous orbit. In yet another embodiment, the tug may provide the propulsion to a spacecraft to another planet.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A transit tug comprising:
    a longitudinal frame having a first and second ends and a length between the first and second ends and an inside volume that is in communication with space outside of the longitudinal frame, an outer periphery, and a substantially hollow interior;
    a docking adapter disposed on the first and second ends of the longitudinal frame, fuel residing within the longitudinal frame and the docking adapters at opposing ends of the longitudinal frame and the fuel in between the docking adapters;
    a plurality of chemical tanks disposed within the longitudinal frame, at least one tank comprised of an oxidizer and one tank comprised of a propellant, each tank having an access valve for refueling in space and each tank removably secured to the longitudinal frame such that a tank can be replaced in space;
    a plurality of nozzles disposed on the outer periphery of the longitudinal frame and each nozzle having a valve for regulating the flow of the oxidizer and fuel from the tanks, wherein the number and disposition of the nozzles can be chosen for a desired execution of orienting and propelling the transit tug in space;
    a plurality of solar cell arrays connected to the outer periphery of the longitudinal frame and disposed on the outer periphery of the longitudinal frame and each solar cell array having a positioning system such that each array is independently pivotal in relation to the longitudinal frame;
    at least one battery; a wireless communications system connected to the batteries; and
    a computer connected to the at least one battery, the nozzle valves, the positioning system of the solar cell arrays, the solar cell arrays, the wireless communications system, and the computer controls charging of the batteries by the solar cell arrays, directs the flow of the oxidizer and fuel to each nozzle, controls ignition of the oxidizer and fuel combination, controls the positioning of the solar cell arrays, operates the communications system, executes avionics software, provides a status of the tug including the level of oxidizer and fuel in the tanks, operates the docking adapters, and implements a three axis attitude control; wherein, power is provided to the space tug by the solar cell arrays and the computer can be accessed through a wireless communications so that the tug can be moved to a desired location in space and attached by way of a docking adapter to another craft and provide propulsion to the craft.

2. The transit tug of claim 1 further comprising a cable that extends from approximately the length from the first end to the second end and adapted to connect to at least one other tug at one end to a spacecraft at the other end.

\* \* \* \* \*